March 24, 1925.
J. G. DOUGLESS
DIRIGIBLE HEADLIGHT
Filed Aug. 23, 1924
1,531,083
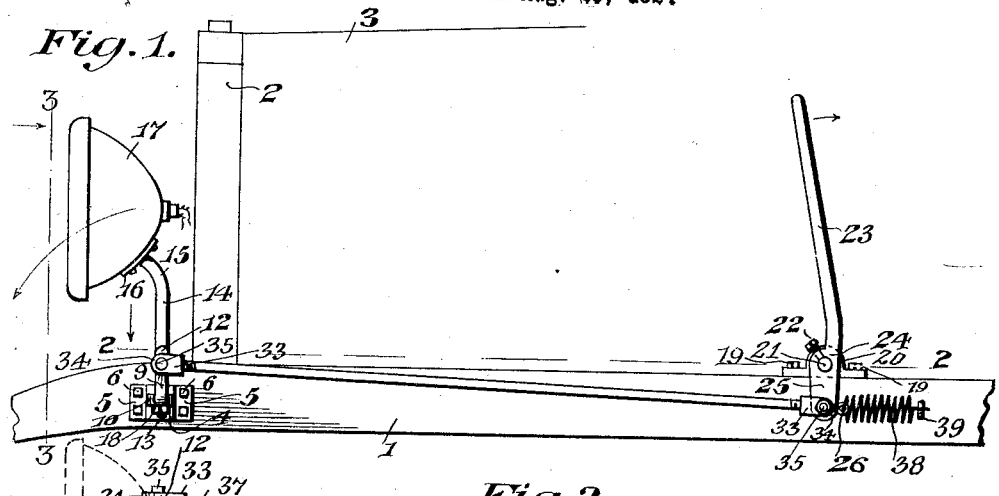
INVENTOR.
Joseph G. Douglass,
BY Geo. P. Kimmel
ATTORNEY.

Patented Mar. 24, 1925.

1,531,083

UNITED STATES PATENT OFFICE.

JOSEPH GORGE DOUGLESS, OF HUNTSVILLE, ALABAMA.

DIRIGIBLE HEADLIGHT.

Application filed August 23, 1924. Serial No. 733,790.

*To all whom it may concern:*

Be it known that I, JOSEPH G. DOUGLESS, a citizen of the United States, residing at Huntsville, in the county of Madison and State of Alabama, have invented certain new and useful Improvements in Dirigible Headlights, of which the following is a specification.

This invention relates to dirigible headlights and has for its primary object the provision, in a manner as hereinafter set forth, of a structure whereby the operator of a vehicle will be enabled to shift the headlights thereof in such a manner as to direct them downwardly in front of the vehicle to thus remove the glare of the light projected therefrom, from the face of the driver of an approaching vehicle.

Another object of the invention is the provision, in a manner as hereinafter set forth, of a mechanism for shifting vehicle lights in a manner as above set forth, and having means associated therewith, whereby the lights will be caused to reassume their former and normal vertical and forwardly directed position without the attention of the operator of the vehicle.

A final object of the invention is the provision, in a manner as hereinafter set forth, of a dirigible headlight of the character above set forth, of simple construction, strong and durable, neat in appearance, of easy action and inexpensive to manufacture and install.

The invention will be best understood from a consideration of the following description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows the side elevation of a portion of the front part of the chassis frame of an automobile, the radiator and the hood thereof being conventionally indicated and showing the device embodying this invention in side elevation applied thereto.

Figure 2 is a horizontal section taken upon the line 2—2 of Figure 1.

Figure 3 is a front elevation of the automobile lamp and supporting an operating structure, a portion of the structure being shown in section, which section is taken upon the line 3—3 of Figure 1.

Figure 4 is a detail sectional view taken upon the line 4—4 of Figure 2.

Referring now to the drawing in detail wherein like numerals of reference indicate corresponding parts throughout the several views of the drawing, there is indicated at 1 the side beams of the chassis frame of an automobile, having the usual radiator 2 thereon and hood 3 positioned behind the said radiator.

The chassis beams are of the usual channel iron construction, the channels thereof being turned inwardly, and each beam has secured to the outer face thereof at a point slightly forward of the radiator 2, a bearing block 4 which bearing block has the laterally extending ears 5, through which is extended the securing bolts 6, which extend through and are secured to the beam 1 as shown to retain the bearing blocks 4 in position. Each of these bearing blocks has an axial bore therethrough and through the axial bore of each of the bearing blocks there is extended a stub shaft 7, which terminates in a head 8 countersunk in the end of the block 4 and bearing against the side of the channel bar, as shown.

The outer end of each of the stub shafts 7 is formed integral with the end of one leg of a right angularly formed bracket 9, that portion 10 of each of the brackets 9 being horizontally positioned and of substantial width as shown and further having formed therethrough a normally vertical passage 11. The other leg 12 of each of the brackets 9 is normally vertically positioned as shown and is of materially less width than the horizontal leg 10. This leg 12 of each bracket has a transverse passage formed therethrough, the purpose of which will become apparent as the description of the device proceeds.

Extending through each of the apertures 11, in the horizontal legs 10, is a reduced portion 13 of a vertical standard 14, the upper end of which is curved outwardly as at 15 and carries at its outer end a plate 16, which is secured to and supports a light projector 17. A securing nut 18 is threaded upon the lower end of the reduced portion 13 to hold the standard 14 rigidly in position.

Secured to the top of each side bar 1, by means of the bolts 19 and preferably at a point slightly forwardly of the driver's seat, is a bearing 20. Extending between the side beams 1 and having each end extending through and resting in one of the bearings 20, is a revoluble shaft 21, as shown. Secured by means of a set screw 22 to one outer end of the shaft 21, upon the outside of the bearing 20 and beam 1, is a lever 23, the lower end of which is enlarged, as at 24, and apertured to allow for the passage of the end of the shaft 21. The enlarged lower end 24 is extended downwardly to provide the short arm 25, through which an aperture is formed and to the back of which there is secured an eye 26.

Upon the other end of the shaft 21, upon the outside of the bearings 20, there is secured a collar 27, carrying at the outer portion thereof a depending finger 28, which depending finger is substantially the same length as the short arm 25 upon the lower end of the lever 23. This depending finger likewise has a transverse aperture therethrough and also has affixed to its rear edge an eye 29. A securing nut is threaded upon one end of the shaft 21, as indicated at 30, to retain the same in position.

Extending between the short arm 25 of the lever 23 and the vertical arm 12 of the bracket 9 upon the same side of the chassis frame, is a connecting bar 31, and upon the opposite side of the chassis frame is a second connecting bar 32, which extends from the depending finger 28 to the vertical arm 12 of the bracket 9 upon that side of the frame, and each of these connecting bars 31 and 32 has each end threaded into a bifurcated block 33, the furcations 34 of each of which straddle one of the arms 12, the finger 28 or the short arm 25, and a pivot bolt 35 connects the furcations to retain the block in connection with one of these members. Owing to the fact that the vertical arm 12 of each of the brackets stretches out a greater distance from the bifurcated bars than does the finger 28 or the depending arm 25, each of the connecting bars 31 and 32 is bent outwardly, as at 36 and forwardly again as at 37 to make a proper connection with the bifurcated block 33 at the forward end of each.

From the foregoing description it may be seen that upon shifting the lever 23 from the position shown in Figure 1 and drawing the same backwardly, the lower short arm 25 will be swung forwardly as will also the depending finger 28 upon the opposite side of the chassis frame, due to the revolution of the shaft 21, and the coupling bars 31 and 32 will be moved forwardly to swing over the upstanding arm 12 of each of the brackets 9, which will swing the vertical standard 14 forward and thus direct the light projector carried thereby towards the ground.

In order that it may not be necessary for the operator to reverse the movement of the lever 23 to raise the light projectors 17 to the former normal position, an expansible spring 38 is provided at each side of the chassis frame, one end of which frame is in engagement with one of the eyes 29 or 30 and the other end thereof engages the eye of an eye-bolt 39, carried by and secured to each side beam of the chassis frame by means of the nut 40. These springs 38 act to draw the short arm 25 and the finger 28 backwardly when the lever 23 is released thus raising the light projectors 17 to their normal vertical position.

From the foregoing description it may be seen that a novel and unique headlight shifting mechanism is provided which is simple in structure, easily manipulated, and, due to the action of the springs 38, will operate itself without the attention of the vehicle operator, to return the light projectors to their former normal position.

Having thus described the invention, what I claim is:—

1. In an apparatus of the character set forth, a pair of light projectors, a supporting standard for each, a pair of right angled brackets each adapted to be supported upon one side of a chassis frame to revolve upon the long axis of one arm thereof, said arm of each bracket supporting one of said standards, a revoluble shaft adapted to extend across said frame, a depending element upon each end of said shaft adapted to pendulate upon actuation thereof, a connecting element extending between said depending elements and the terminal end of the other arm of each bracket, and actuating means upon said shaft for said apparatus.

2. In an apparatus of the character set forth, a pair of light projectors, a supporting standard for each, a pair of right angled brackets each adapted to be supported upon one side of a chassis frame to revolve upon the long axis of one arm thereof, said arm of each bracket supporting one of said standards, a revoluble shaft adapted to extend across said frame, a depending element upon each end of said shaft adapted to pendulate upon actuation thereof, a connecting element extending between said depending elements and the terminal end of the other arm of each bracket, actuating means upon said shaft for said apparatus, and means whereby said apparatus will be caused to automatically return to a normal forward light projecting position.

3. In an apparatus of the character set forth, a pair of light projectors, a supporting standard for each, a pair of right angled brackets each adapted to be supported upon one side of a chassis frame to revolve upon the long axis of one arm thereof, said arm of each bracket supporting one of said standards, a revoluble shaft adapted to extend across said frame, a depending element upon each end of said shaft adapted to pendulate upon actuation thereof, a connecting element extending between said depending elements and the terminal end of the other arm of each bracket, and actuating means upon said shaft for said apparatus, said connecting rods each being threadably and pivotally connected at each end to the members which it links together.

4. In an apparatus of the character set forth, a pair of light projectors, a supporting standard for each, a bearing block adapted to be secured to each side rail of a chassis frame, a pair of right angled brackets each having one arm reduced at its end to provide a stub shaft adapted to be fitted into one of said blocks, said arm of each bracket supporting one of said standards, a revoluble shaft adapted to extend across said frame, a depending element upon each end of said shaft adapted to pendulate upon actuation thereof, a connecting element extending between said depending elements and the terminal end of the other arm of each bracket, and actuating means upon said shaft for controlling said apparatus.

5. In an apparatus of the character set forth, a pair of light projectors, a supporting standard for each, a bearing block adapted to be secured to each side rail of a chassis frame, a pair of right angled brackets each having one arm reduced at its end to provide a stub shaft adapted to be fitted into one of said blocks, said arm of each bracket supporting one of said standards, a revoluble shaft adapted to extend across said frame, a depending element upon each end of said shaft adapted to pendulate upon actuation thereof, a connecting element extending between said depending elements and the terminal end of the other arm of each bracket, actuating means upon said shaft for controlling said apparatus, and means whereby said apparatus will be caused to automatically return to a normal forward light projecting position.

In testimony whereof, I affix my signature hereto.

JOSEPH GORGE DOUGLESS.